(12) United States Patent
Cantrell

(10) Patent No.: US 12,513,051 B1
(45) Date of Patent: Dec. 30, 2025

(54) SYSTEMS AND METHODS FOR COMMUNICATING WITH LOCALLY CONNECTED PRINTERS AND COPIERS

(71) Applicant: Lioce Meters, LLC, Huntsville, AL (US)

(72) Inventor: Alex Raymond Cantrell, Town Creek, AL (US)

(73) Assignee: Lioce Meters, LLC, Huntsville, AL (US)

( * ) Notice: Subject to any disclaimer, the term of this patent is extended or adjusted under 35 U.S.C. 154(b) by 103 days.

(21) Appl. No.: 18/532,283

(22) Filed: Dec. 7, 2023

Related U.S. Application Data

(60) Provisional application No. 63/434,180, filed on Dec. 21, 2022.

(51) Int. Cl.
  *H04L 41/12* (2022.01)
  *G06F 3/12* (2006.01)
  *H04L 43/02* (2022.01)

(52) U.S. Cl.
  CPC ............ *H04L 41/12* (2013.01); *G06F 3/1293* (2013.01); *H04L 43/02* (2013.01)

(58) Field of Classification Search
  CPC ........ H04L 41/12; H04L 43/02; G06F 3/1293
  See application file for complete search history.

(56) References Cited

U.S. PATENT DOCUMENTS

| | | | |
|---|---|---|---|
| 2017/0308334 A1* | 10/2017 | Doyle, Sr. | G06F 3/1207 |
| 2019/0188172 A1* | 6/2019 | Kawai | G06F 13/385 |
| 2022/0021738 A1* | 1/2022 | Patel | H04L 43/0876 |

OTHER PUBLICATIONS

Hewlett Packard; "Discovering Devices using HP Web Jetadmin"; Jul. 2021 (Year: 2021).*

* cited by examiner

*Primary Examiner* — Glenton B Burgess
*Assistant Examiner* — Jihad K Boustany
(74) *Attorney, Agent, or Firm* — Bradley Arant Boult Cummings LLP; Stephen H. Hall; Alex H. Huffstutter

(57) ABSTRACT

Systems and methods for communicating with locally connected printers and copiers are disclosed. Such systems comprise a USB2SNMP component (on an end-user computer) that forwards SNMP data-collection requests from a data-collection component to a printer locally connected to the end-user computer. The printer responds by sending data to the USB2SNMP component for forwarding to the data-collection component.

12 Claims, 13 Drawing Sheets

SYSTEMS AND METHODS FOR COMMUNICATING WITH LOCALLY CONNECTED PRINTERS AND COPIERS

CROSS-REFERENCES TO RELATED APPLICATIONS

This application claims the benefit of U.S. Provisional Patent Application No. 63/434,180 filed Dec. 21, 2022, which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Disclosure

This disclosure relates generally to information and communication technology specially adapted for: metering services (including record keeping) for copiers, printers, scanners, and other office equipment; and business automation. This disclosure also relates generally to digital-computing and data-processing systems or methods, specially adapted for administrative, commercial, financial, managerial, supervisory, or forecasting purposes—including, for example: administration; management; commerce (e.g., price estimation, price determination, billing, and invoicing); metering services (including record keeping) for copiers, printers, scanners, and other office equipment; and business automation. This disclosure also relates generally to data collection, including meter-, supply-, and service-data for printers and copiers (e.g., printers and copiers that are locally connected to a computer, including by universal serial bus (USB), parallel, or other methods).

2. Description of the Prior Art

Printer-and-copier managed-service providers need to regularly collect meter data to determine billing amounts for customers. This data collection is also useful for automatic supply fulfillment and service-call logging. Locally connected devices present a challenge when collecting this information, because the printer or copier is not on the network and cannot be collected with industry-specific collection software (e.g., FMAUDIT, NETAPHOR SITEAUDIT, etc.).

One known method of data collection for locally connected devices is to: (1) manually collect data by physically regularly visiting every device; and (2) print a datasheet at the printer or copier. But this method presents at least two problems. First, it is expensive to dispatch an employee to collect data on a large number of printers and copiers. Second, data collection by this method is slow, and typically data collection is only done once per quarter (or less); because it takes so long, supply- and service-data cannot be collected and utilized promptly, regularly, or effectively.

Another known method of data collection for locally connected devices is to use software solutions to monitor the print queues of locally connected printers or copiers and get a count of prints. But this method presents at least four problems. First, this method only counts print jobs and does not provide a true meter of the device; this can cause billing issues, because an accurate beginning meter is necessary, and it must be understood that billing is on counts instead of meters; also, this is only prints and not copies of a device which is a multi-function printer (MFP). Second, if there are multiple queues pointing to the same printer, then this can cause counting inconsistencies and billing issues. Third, data security can also be an issue, because some applications require administrative access to infrastructure for management data and operations (e.g., WINDOWS MANAGEMENT INSTRUMENTATION ("WMI")) to monitor the queues; also, the client might want access to the print-job data, which can be viewed as an additional security risk. Fourth, this method does not collect supply or service data.

Another known method of data collection for locally connected devices is to install a network switch. In some office environments, users work in areas or cubicles that are configured with only one network port. That one network port is used for the computer (e.g., a desktop, laptop, or other personal computer). Thus, several desktop printers or copiers become connected locally over Universal Serial Bus (USB), because of a lack of network ports within close proximity of the printer or copier. The locally connected printer or copier can be converted to a networked printer or copier by installing a network switch (or a network splitter) at this single port. But this method presents at least three problems. First, network switches are relatively expensive. Second, unmanaged network switches in such a context can be a security risk. Third, this method puts the printer or copier on the network and creates additional security risks.

Thus, a need exists for systems and methods for cost-effectively, securely, speedily, efficiently, and regularly collecting meter-, supply-, and/or service-data for printers and copiers that are locally connected. And opportunities exist to ease the time-and-resources burden associated with known systems and methods for collecting meter-, supply-, and/or service-data for printers and copiers that are locally connected. And opportunities exist to improve on the security of known systems and methods for collecting meter-, supply-, and/or service-data for printers and copiers that are locally connected. Systems and methods for cost-effectiveness, security, speed, efficiency, and regularity are generally desirable.

BRIEF SUMMARY

A system for communicating with locally connected office devices is disclosed, which in one embodiment comprises: an end-user computer coupled to data-collection software; a USB2SNMP component coupled to the end-user computer; a USB network adapter coupled to the end-user computer; an Ethernet cable coupled to the USB network adapter; and an office device coupled to the Ethernet cable; wherein the USB2SNMP component forwards SNMP data requests from the data-collection software to the office device by the USB network adapter and the Ethernet cable, and wherein the office device responds to the SNMP data requests by sending data back to the data-collection software by the Ethernet cable, the USB network adapter, and the USB2SNMP component.

The above summary presents a simplified summary to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

In a particular embodiment, an exemplary system for communicating with locally connected office devices as disclosed herein may include an end-user computer, a USB2SNMP component, a USB network adapter, an Ethernet cable, and an office device. The end-user computer may be coupled to data-collection software. The USB2SNMP component may be coupled to the end-user computer. The USB network adapter may be coupled to the end-user computer. The Ethernet cable may be coupled to the USB network adapter. The office device may be coupled to the Ethernet cable. The USB2SNMP component may be configured to forward SNMP data requests from the data-collection software to the office device by the USB network adapter and the Ethernet cable. The office device may be configured to respond to the SNMP data requests by sending data back to the data-collection software by the Ethernet cable, the USB network adapter, and the USB2SNMP component.

In an exemplary aspect according to the above-referenced embodiment, the system may further comprise a local SNMP data collector coupled to the end-user computer. The local SNMP data collector may be configured to receive the data from the office device.

In another exemplary aspect according to the above-referenced embodiment, the local SNMP data collector may include an aggregator configured to organize the data with other data from other locally connected or wirelessly connected office devices.

In another exemplary aspect according to the above-referenced embodiment, the system may further comprise a network and a cloud data aggregator. The network may be coupled to the local SNMP data collector. The cloud data aggregator may be coupled to the network. The cloud data aggregator may be configured to receive the data from the office device through the local SNMP data collector and organize the data with other data from other locally connected or wirelessly connected office devices.

In another exemplary aspect according to the above-referenced embodiment, the data-collection software may be installed on the local SNMP data collector.

In another exemplary aspect according to the above-referenced embodiment, the data-collection software may be installed on the end-user computer.

In another exemplary aspect according to the above-referenced embodiment, the USB2SNMP component may comprise software installed on the end-user computer.

In another exemplary aspect according to the above-referenced embodiment, the data from the office device may include at least one of meter-data, supply-data, or service-data.

In another exemplary aspect according to the above-referenced embodiment, the data-collection software may reside on a local SNMP data collector coupled to the end-user computer.

In another exemplary aspect according to the above-referenced embodiment, the system may further comprise a management information base (MIB) browser software coupled to the end-user computer. The MIB browser software may be configured to send test SNMP data requests to one or more of the end-user computer or the office device.

In another embodiment, method for communicating with locally connected office devices as disclosed herein may comprise (a) providing an end-user computer coupled to data-collection software, the end-user computer further coupled to a USB2SNMP component and a USB adapter, the USB adapter coupled to the office device; (b) directing the USB2SNMP component to send SNMP data requests received from the data-collection software to the office device over the USB adapter; and (c) sending data from the office device to the data-collection software through the USB2SNMP component and the USB adapter in response to the SNMP data requests, wherein the data includes at least one of meter-data, supply-data, or service-data.

In an exemplary aspect according to the above-referenced embodiment, the method may further comprise restricting access to the office device to only the end-user computer via the USB adapter.

In another exemplary aspect according to the above-referenced embodiment, the method may further comprise regularly collecting data from the office device as directed by the data-collection software.

In another exemplary aspect according to the above-referenced embodiment, the USB adapter may be coupled to the office device using an Ethernet cable.

In another exemplary aspect according to the above-referenced embodiment, the method may further comprise transmitting the data from the end-user computer to a local SNMP data collector.

In another exemplary aspect according to the above-referenced embodiment, the data-collection software may be hosted on the local SNMP data collector.

In another exemplary aspect according to the above-referenced embodiment, the method may further comprise aggregating the data from the office device with other data from other locally connected or wirelessly connected office devices on the local SNMP data collector.

In another exemplary aspect according to the above-referenced embodiment, the method may further comprise sending the data from the local SNMP data collector to a cloud data aggregator configured to organize the data with other data from other locally connected or wirelessly connected office devices.

In another exemplary aspect according to the above-referenced embodiment, the method may further comprise sending test SNMP data requests from a management information base (MIB) browser software to one or more of the end-user computer or the office device for testing purposes.

In another embodiment, an exemplary system for communicating with locally connected office devices as disclosed herein may include an end-user computer, a USB2SNMP component, a USB adapter, and a locally connected office device. The end-user computer may be coupled to a data-collection component. The USB2SNMP component may be coupled to the end-user computer. The USB adapter may be coupled to the end-user computer. The locally connected office device may be coupled to the USB adapter. The USB2SNMP component may be configured to forward SNMP data requests from the data-collection component to the office device by the USB adapter. The office device may be configured to respond to the SNMP data requests by sending data back to the data-collection component by the USB adapter and the USB2SNMP component.

BRIEF DESCRIPTION OF THE SEVERAL VIEWS OF THE DRAWINGS

The following drawings are attached to—and form a portion of—this disclosure:

FIG. 4 is a depiction of a textual and visual representation of meter-, supply-, and/or service-data.

FIG. 5 is a depiction of a textual and visual representation of meter-, supply-, and/or service-data.

FIG. 6 is a depiction of a textual and visual representation of meter-, supply-, and/or service-data.

FIG. 7 is a depiction of a textual and visual representation of meter-, supply-, and/or service-data.

FIG. 10 is a depiction of a textual and visual representation of meter-, supply-, and/or service-data.

DEFINITIONS

Figure 1:
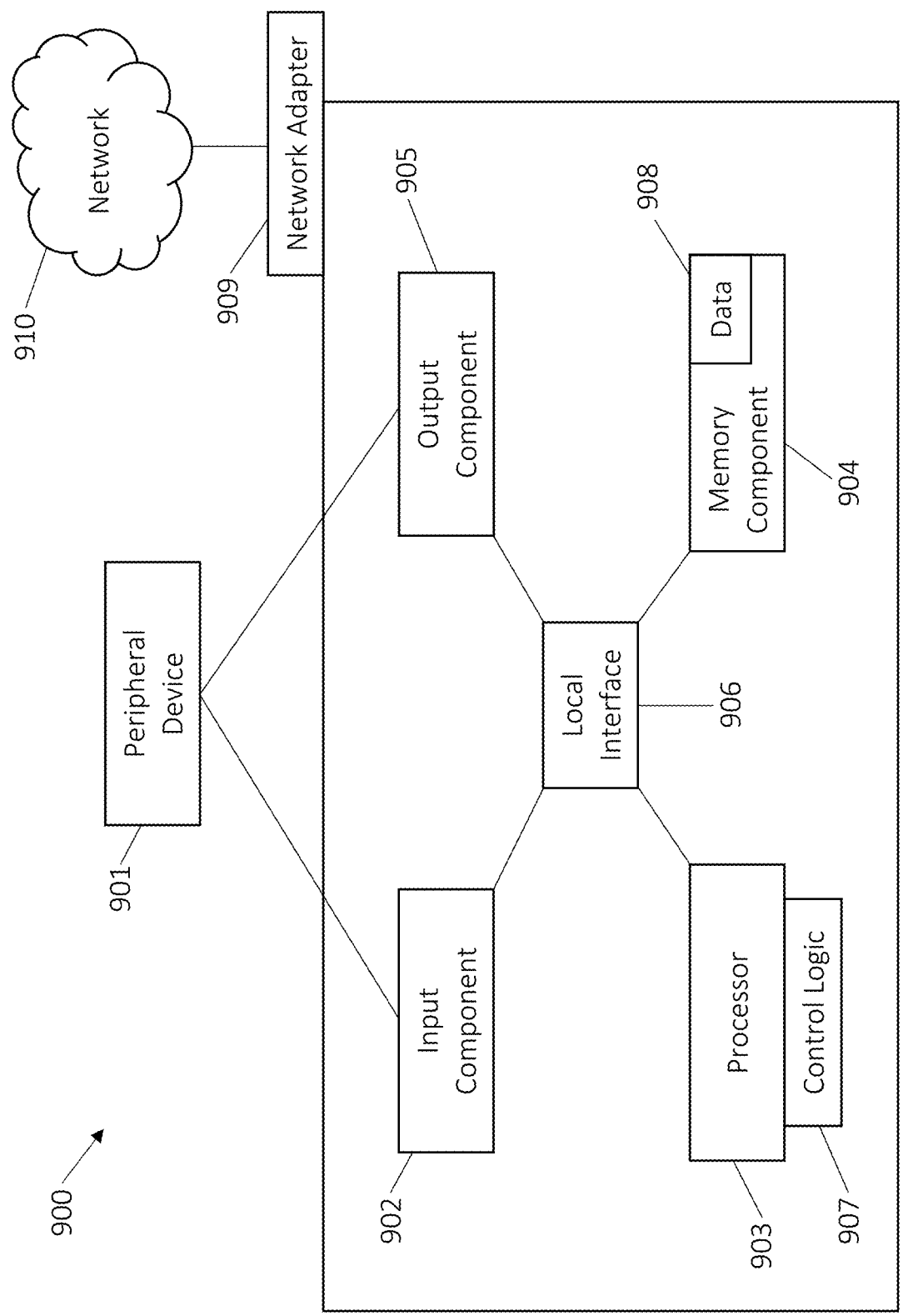
FIG. 1 is a schematic view of a computer.

Unless otherwise defined, all terms (including technical and scientific terms) in this disclosure have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly defined otherwise in this disclosure. For brevity or clarity, well known functions or constructions may not be described in detail.

The terms "about" and "approximately" shall generally mean an acceptable degree of error or variation for the quantity measured in light of the nature or precision of the measurements. Typical, exemplary degrees of error or variation are within 20 percent (%), preferably within 10%, more preferably within 5%, of a given value or range of values. Numerical quantities given in this description are approximate unless stated otherwise, meaning that the term "about" or "approximately" can be inferred when not expressly stated.

The terminology used throughout the disclosure is for the purpose of describing particular embodiments only and is not intended to be limiting. The singular forms "a," "an," and "the" are intended to include the plural forms as well, unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

The terms "coupled to," "coupling," "connected to," "in connection with," "in communication with," or "connecting" include any suitable connection or communication, including mechanical connection, electrical connection (e.g., one or more wires), or signal-conducting channel (e.g., BLUETOOTH, near-field communication (NFC), or other inductive coupling or radio-frequency (RF) link).

The term "processor" may include one or more processors having processing capability necessary to perform the processing functions described herein, including but not limited to hardware logic, computer readable instructions running on a processor, or any suitable combination thereof. A processor may run software to perform the operations described herein, including software accessed in machine readable form on a tangible non-transitory computer readable storage medium, as well as software that describes the configuration of hardware such as hardware description language (HDL) software used for designing chips.

The term "computer" may include a uniprocessor or multiprocessor machine, in the form of a desktop, laptop, remote server, tablet computer, smartphone, or other computing device. Accordingly, a computer may include one or more processors.

Examples of processors include sequential state machines, microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), gated logic, and other suitable hardware configured to perform the various functionality described throughout this disclosure.

Additionally, a computer may include one or more memories. A memory may include a memory storage device or an addressable storage medium which may include, by way of example, random access memory (RAM), static random access memory (SRAM), dynamic random access memory (DRAM), electronically erasable programmable read-only memory (EEPROM), programmable read-only memory (PROM), erasable programmable read-only memory (EPROM), hard disks, floppy disks, laser disk players, digital video disks, compact disks, video tapes, audio tapes, magnetic recording tracks, magnetic tunnel junction (MTJ) memory, optical memory storage, quantum mechanical storage, electronic networks, and/or other devices or technologies used to store electronic content such as programs and data.

In particular, such one or more memories may store computer executable instructions that, when executed by the one or more processors, cause the one or more processors to implement the procedures and techniques described herein. The one or more processors may be operably associated with the one or more memories so that the computer executable instructions can be provided to the one or more processors for execution. For example, the one or more processors may be operably associated to the one or more memories through one or more buses. Furthermore, the computer may possess or may be operably associated with input devices (e.g., a keyboard, a keypad, controller, a mouse, a microphone, a touch screen, a sensor) and output devices such as (e.g., a computer screen, printer, or a speaker).

A computer may execute an appropriate operating system such as LINUX, UNIX, MICROSOFT WINDOWS, APPLE MACOS, IBM OS/2, ANDROID, and PALM OS, and/or the like. A computer may advantageously be equipped with a network communication device such as a network interface card, a modem, or other network connection device suitable for connecting to one or more networks.

A computer may advantageously contain control logic, or program logic, or other substrate configuration representing data and instructions, which cause the computer to operate in a specific and predefined manner as, described herein. In particular, the computer programs, when executed, enable a control processor to perform and/or cause the performance of features of the present disclosure. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

A control logic conventionally includes the manipulation of digital bits by the processor and the maintenance of these bits within memory storage devices resident in one or more of the memory storage devices. Such memory storage devices may impose a physical organization upon the collection of stored data bits, which are generally stored by specific electrical or magnetic storage cells.

A control logic generally performs a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, files, or the like. It should be kept in mind, however, that these and some other terms should be associated with appropriate physical quantities for computer operations, and that these terms are merely conventional labels applied to physical quantities that exist within and during operation of the computer based on designed relationships between these physical quantities and the symbolic values they represent.

It should be understood that manipulations within a computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general-purpose computing machines or devices may be used with programs constructed in accordance with some of the teachings described herein. In some embodiments, very specific computing machines, with specific functionality, may be required. Similarly, it may prove advantageous to construct a specialized apparatus to perform the method steps described herein by way of dedicated computer systems with hard-wired logic or programs stored in nonvolatile memory, such as, by way of example, read-only memory (ROM).

In some embodiments, features of computers can be implemented primarily in hardware using, for example, hardware components such as application specific integrated circuits (ASICs) or field-programmable gated arrays (FPGAs). Implementation of the hardware circuitry will be apparent to persons skilled in the relevant art(s). In yet another embodiment, features of computers can be implemented using a combination of both general-purpose hardware and software.

The term "signal" means any suitable signal, for example a voltage, a current, a duty cycle, a frequency of electrical oscillation, or a mechanical signal (e.g., pressure, vibration, a tap, or other mechanical signal) in some embodiments.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. The disclosure shows and describes only certain embodiments of the processes, machines, manufactures, compositions of matter, and other teachings disclosed; but as mentioned above, it is to be understood that the teachings of the present disclosure are capable of use in various other combinations, modifications, and environments and are capable of changes or modifications within the scope of the teachings of this disclosure, commensurate with the skill and knowledge of a person having ordinary skill in the relevant art. The embodiments described are further intended to explain certain best modes known of practicing the processes, machines, manufactures, compositions of matter, and other teachings of the disclosure and to enable others skilled in the art to utilize the teachings of the disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

Systems and methods for communicating with locally connected printers and copiers have been developed. Embodiments of the systems and methods are described herein. The embodiments are described with particular reference to printers and copiers that are locally connected to a computer (e.g., a desktop, laptop, or other personal computer (including those based on x86 or x86-64 chips)) by USB, parallel, or other methods. But similar advantages may be enjoyed with other business or office devices connected by other methods to other kinds of computers. The specific type of device, connection, and computer are not important, and embodiments of the invention are agnostic as to the specific types of device, connection, and computer used.

Some embodiments of the present invention may comprise a workstation. A worker uses a computer, specifically the worker computer. The worker computer has a worker computer screen that provides information to the worker, including information about the status of actions performed by the worker in using the worker computer. The worker computer also has a worker camera. The worker computer might also have other input, output, and recording components. In some settings there are sometimes more than one worker.

FIG. 1 is a schematic view of a computer 900. The worker computer is such a computer 900. Also (as described in detail below, with reference to FIGS. 2A, 2B, and 2C) the end-user computer 2 is such a computer 900. The computer 900 may also be referred to herein as a end-user computer 900.

The computer 900 has at least one peripheral device 901. The peripheral device 901 could be a screen (e.g., the worker computer screen), a camera (e.g., the worker camera), a keyboard, a mouse, or any other peripheral device. The computer 900 has an input component 902 that is coupled to and takes input from the peripheral device 901. The input component 902 may include various components to couple the at least one peripheral device 901 to the computer 900. The input component 902 can be configured to receive data from the peripheral device 901 (e.g., via wired or wireless communication, conductive communication, etc.) and to provide it for storage in memory component 904. In some embodiments, the computer 900 may be coupled communicatively to the peripheral device 901 via the input component 902—for example, via conductive means or via short-range communication protocol, such as BLUETOOTH.

The computer 900 has at least one processor component 903 that is coupled to the input component 902 and which includes processing hardware for executing instructions stored in a memory component 904. As an example, the processor component 903 may include a central processing unit (CPU)—for example one or more microprocessors, such as an INTEL CORE processor—or a digital signal processor (DSP). The processor component 903 communicates with and drives the other components within the computer 900 via a local interface 906 which can include at least one bus. In addition, the computer 900 comprises an output component 905 which can be used to output data to a user of the system (e.g., a worker) Other components are possible in other embodiments and may be present in the various embodiments of the computer 900 in order to achieve the functionality described herein.

The input component 902 and the output component 905 may be one and the same component (e.g., a modem). The input component 902 and the output component 905 may include various components for receiving user inputs and for providing outputs to users. The input component 902 and the output component 905 can include various devices and can be implemented in hardware, software, and/or various combinations thereof. In some embodiments, the input component 902 and the output component 905 can each include one or more switches, buttons, touchscreens, knobs, dials, lights, video adapters, monitors, printers, analog-to-digital converters, and various combinations thereof. In some embodiments, the input component 902 and the output component 905 may each be coupled to the processor 903. The input component 902 and the output component 905 provide the capability to input data to or to output data from the computer 900.

The memory component 904 stores both program instructions that are executed by the processor 903 and data that are used and processed by the processor 903. The memory component 904 may be a tangible storage medium. Examples of tangible (or non-transitory) storage medium include disks, thumb drives, hard drives, and other forms of memory. Tangible computer readable storage medium include volatile and non-volatile media—which may be removable or non-removable—such as computer readable instructions, data structures, program modules, or other data. Examples of such media include: electronic memory devices such as random-access memory (RAM), read-only memory (ROM), programmable read-only memory (PROM), electrically erasable programmable read-only memory (EEPROM), and flash memory; and electro-mechanical memory, which may use an integrated drive electronics (IDE) interface, or a variation or enhancement thereof such as enhanced IDE (EIDE) or ultra-direct memory access (UDMA), or a small computer system interface (SCSI) based interface, or a variation or enhancement thereof, such as fast-SCSI, wide-SCSI, fast-and-wide-SCSI, or Serial Advanced Technology Attachment (SATA), or a variation or enhancement thereof, or a fiber-channel-arbitrated-loop (FC-AL) interface; flash memory, disks or optical storage; magnetic storage; or any other non-transitory medium that stores information.

The computer 900 includes control logic 907 for generally controlling the operation of the computer 900. The control logic 907 may include instructions, logic, and/or various combinations thereof that, when executed by the computer 900 (i.e., by the processor 903), cause the computer 900 to control resources to perform some or all of the functionality described herein. The control logic 907 may be implemented in software, hardware, firmware, or any combination thereof. In the exemplary computer 900 illustrated by FIG. 1, the control logic 907 is implemented in software and stored in the memory component 904 of the computer 900. Note that the control logic 907, when implemented in software, can be stored and transported on any computer-readable medium for use by or in connection with an instruction apparatus that can fetch and execute instructions.

The computer 900 further comprises data 908 stored in the memory component 904 that includes information received from the peripheral device 901 to which the computer 900 is coupled. The data 908 may include data that represents the output of the worker computer screen during a time. The data 908 may include data that represents the input from the worker camera. The data 908 may include data that represents key-presses, mouse-clicks, facial recognition, time, or other inputs and outputs of the worker computer. In some embodiments, the data 908 may include various other information received by the computer 900. The data 908 can include other data from yet other sources in other embodiments.

The computer 900 further comprises a network adapter 909 that interfaces the computer 900 with a network 910—which may be any public, private, or proprietary data network, such as a LAN and/or a WAN (e.g., the Internet).

Figure 2A:
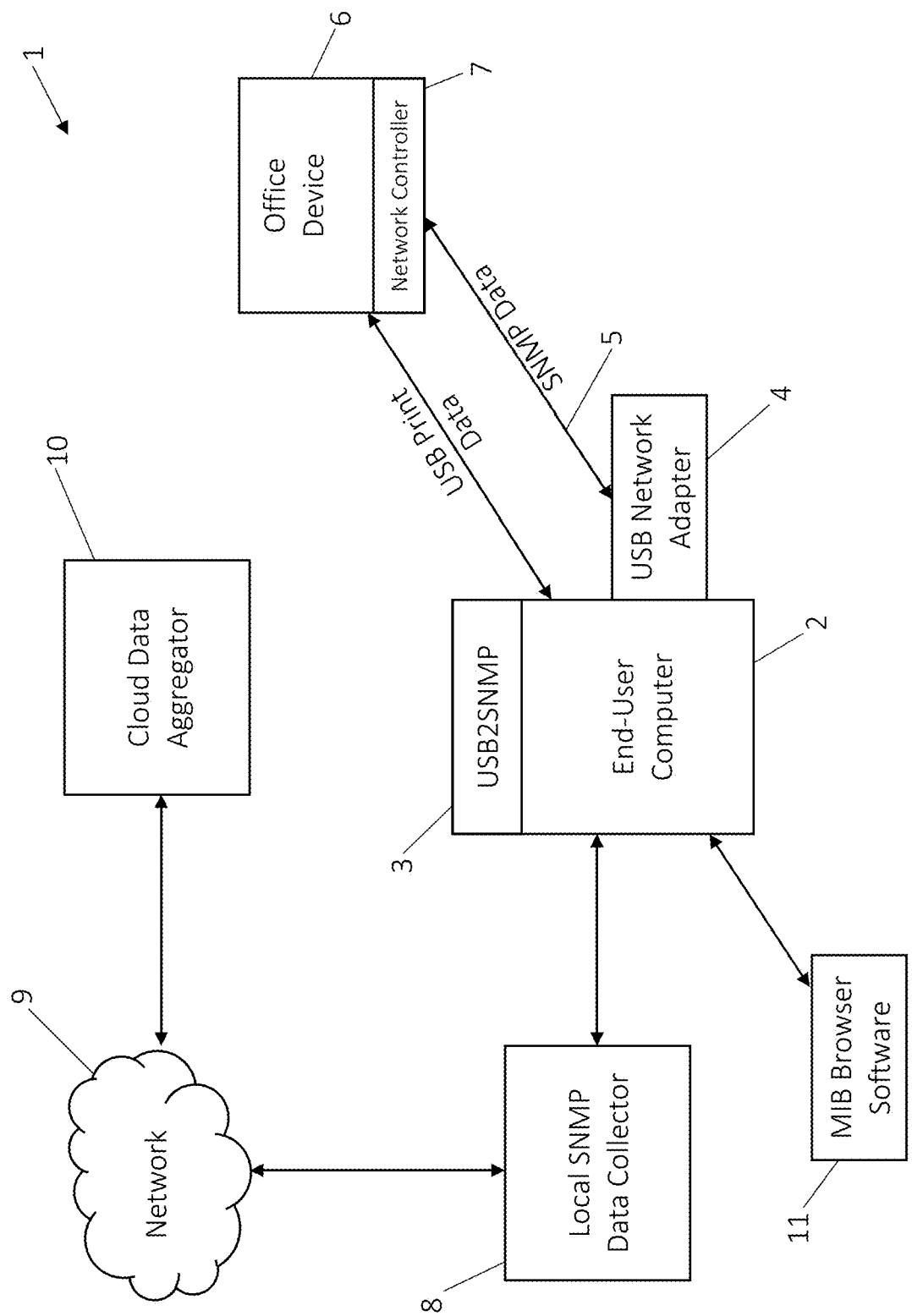
FIG. 2A is a schematic diagram of an embodiment of a system for communicating with locally connected office devices.

FIG. 2A is a schematic diagram of an embodiment of a system 1 for communicating with locally connected office devices.

The system 1 may comprise an end-user computer 2, which is any suitable computer (such as the computer 900 of FIG. 1 or the workstation).

The system 1 may comprise a USB2SNMP component 3. The USB2SNMP component 3 might be associated with hardware either inside or outside the end-user computer 2. The USB2SNMP component 3 might be software that runs on hardware either inside or outside the end-user computer 2. The USB2SNMP component 3 is configured to forward, transmit, and/or receive data-collection requests; the end-user computer 2 facilitates such forwarding, transmitting, and/or receiving of the USB2SNMP component 3 of data-collection requests. The USB2SNMP component 3 is brand- and vendor-agnostic and data-collection software agnostic. The data-collection software may also be referred to herein as a data-collection component. The USB2SNMP component 3 listens (or monitors) for data-collection requests on a specified port or ports (e.g., port 161 and/or port 162). (Port 161 is the industry standard for SNMP data but the USB2SNMP component 3 is capable of being adjusted to monitor on different ports, such as port 162.)

The system 1 may comprise a USB network adapter 4. The USB network adapter 4 may also be referred to herein as a USB adapter. The USB network adapter 4 is any suitable USB network adapter (e.g., an off-the-shelf USB network adapter). One example of a USB network adapter 4 is the BELKIN USB 2.0 Ethernet Adapter—network adapter—USB 2.0-10/100 Ethernet manufactured by CDW LLC. The USB network adapter 4 is coupled to the end-user computer 2. In some embodiments, the USB network adapter 4 is plugged in to the end-user computer 2. The USB network adapter 4 might be associated with hardware either inside or outside the end-user computer 2. The USB network adapter 4 might be software that runs on hardware either inside or outside the end-user computer 2.

The system 1 may comprise an Ethernet cable 5. The Ethernet cable 5 is any suitable Ethernet cable (e.g., an off-the-shelf Ethernet cable). An Ethernet cable is a type of wired network cable commonly used to connect devices in a local area network (LAN), such as computers, routers, and switches. It is designed to facilitate high-speed data transmission between devices, enabling the transfer of data, internet access, and communication within a network. Ethernet cables typically have an RJ45 connector on each end, which allows them to be easily plugged into Ethernet ports on devices. They come in various categories, such as Cat5, Cat5e, Cat6, and Cat7, each offering different levels of data transmission speeds and performance.

The system 1 may comprise an office device 6. The office device 6 may also be referred to herein as a local office device 6 or a locally connected office device 6—e.g., without wireless communication capabilities or limited wireless communication capabilities. The office device 6 could be any suitable office device—for example; a printer, a copier, a scanner, a fax machine, a multi-function device, or any other office device. The office device 6 comprises a network interface controller 7 (also known as an NIC, a network interface card, a network adapter, a LAN adapter, or a physical network interface). The network interface controller 7 is capable of communicating, transmitting, and receiving data and signals according to at least one version of the Simple Network Management Protocol ("SNMP"). In some embodiments, the network interface controller 7 is capable of communicating, transmitting, and receiving data and signals according to SNMPv1; in some embodiments this may be advantageous as a prevalent and easy-to-set-up version of SNMP. In some embodiments, the network interface controller 7 is capable of communicating, transmitting, and receiving data and signals according to SNMPv3; in some embodiments this may be advantageous as a secure version of SNMP. The Ethernet cable 5 couples the office device 6 to the end-user computer 2 by the USB network adapter 4. The USB2SNMP component 3 works on the port level and forwards any requests received on a specified port or ports (e.g., port 161 and/or port 162) to the office device 6. (Port 161 is the industry standard for SNMP data but the USB2SNMP component 3 is capable of being adjusted to forward on different ports.) Because the USB2SNMP component 3 works on the port level, it works: (1) with any SNMP data-collection utility—e.g., the Data Collection Agent (DCA) available from ECI Software Solutions, Inc.; and (2) with any printer or copier (or other office device) from any manufacturer.

In some embodiments, as shown in FIG. 2A, the system 1 may comprise a local SNMP data collector 8 coupled to the end-user computer 2. The end-user computer 2 transmits meter-, supply-, and/or service-data to the local SNMP data collector 8 from the office device 6. In some embodiments, the data-collection software is installed on or resides on the local SNMP data collector 8. In some such embodiments, the local SNMP data collector 8 is coupled to a network 9—which may be any public or proprietary data network, such as a LAN and/or a WAN (e.g., the Internet). In some embodiments, the local SNMP data collector 8 is coupled (e.g., by the network 9) to a cloud data aggregator 10. The cloud data aggregator 10 may be any suitable data aggregator service—for example: FMAUDIT available from ECI Software Solutions, Inc.; as available from MULTCLOUD; or the like. The cloud data aggregator 10 configured to receive the data from the office device through the local SNMP data collector and organize the data with other data from other locally connected or wirelessly connected office devices.

In some embodiments, the system 1 may comprise management information base (MIB) browser software 11. The MIB browser software 11 is any suitable MIB browser software, such as a utility for sending SNMP requests (e.g., GET, GET NEXT, WALK, etc.) to an endpoint (e.g., the end-user computer 2 or the office device 6). In some embodiments, the MIB browser software 11 facilitates testing purposes. For example, a user may use the MIB browser software 11 to send test SNMP requests to the end-user computer 2—which has a USB2SNMP component 3—and then monitor whether the request was received. In some embodiments, this allows a more-controlled testing approach than using a data-collection utility for sending SNMP requests.

The USB2SNMP component 3 leverages the USB network adapter 4 and the Ethernet cable 5 to regularly collect meter-, supply-, and/or service-data (and/or other data) for the office device 6 that is locally connected to the end-user computer 2 via USB, parallel, or other methods (e.g., by the USB network adapter 4 and the Ethernet cable 5). Specifically, the USB2SNMP component 3 on the end-user computer 2 forwards SNMP data-requests from the data-collection software (e.g., as hosted on the local SNMP data collector 8) to the office device 6. The office device 6 responds to the request by sending data back through the USB2SNMP component 3 to the data-collection software (e.g., as hosted on the local SNMP data collector 8). The data-collection software treats this as another networked office device; in some embodiments, the data-collection software thus cannot distinguish between the (locally connected) office device 6 and a traditionally-networked office device; thus no modifications are necessary on the data-collection software, and any SNMP data-collection software can be used with the USB2SNMP component 3. In some embodiments, the office device 6 is the data end-point and has the data to be retrieved.

Thus, the system 1 remedies the problems with known systems and methods by leveraging: (1) the network-connected aspect of the end-user computer 2; and (2) the network capabilities of the locally connected (e.g., by USB) office device 6. In some embodiments, elements of the system 1 (e.g., the USB2SNMP component 3) are used to restrict network access to the office device 6 by restricting to a specific port or ports (e.g., port 161 and/or port 162) the data being forwarded (instead of all ports being open or determined by the office device 6).

One particular advantage of some embodiments of the system 1 is the ability for automated data collection. Once the USB2SNMP component 3 is coupled to the end-user computer 2 (e.g., by installing hardware or software), the data collection happens automatically (e.g., as with any networked office device) and may be set to occur periodically or regularly. However, in some embodiments, the system 1 is more secure than known methods, because the office device: (1) is not directly connected to the Internet; (2) cannot be printed to over a network (e.g., the network 9); and/or (3) cannot be accessed in any way other than via SNMP.

A second advantage of some embodiments of the system 1 is that it is brand- and vendor-agnostic. In some embodiments, because the USB2SNMP component 3 is designed to work on the port level, it will: (1) work with any SNMP data-collection utility; and (2) work with any printer or copier manufacturer.

A third advantage of some embodiments of the system 1 is that it can report real-time meter-, supply-, and/or service-data.

A fourth advantage of some embodiments of the system 1 is that it captures a real meter (instead of counts or calculated meters). A "real meter" is the actual meter of the office device 6 instead of a calculated meter or running count. From a billing perspective, a real meter is easier to invoice and is more aligned with traditional billing practices.

A fifth advantage of some embodiments of the system 1 is that USB network adapters and Ethernet cables can be more cost-effective than network switches.

A sixth advantage of some embodiments of the system 1 is that no unmanaged switches are needed.

A seventh advantage of some embodiments of the system 1 is that the office device 6 is not available on the network.

Figure 2B:
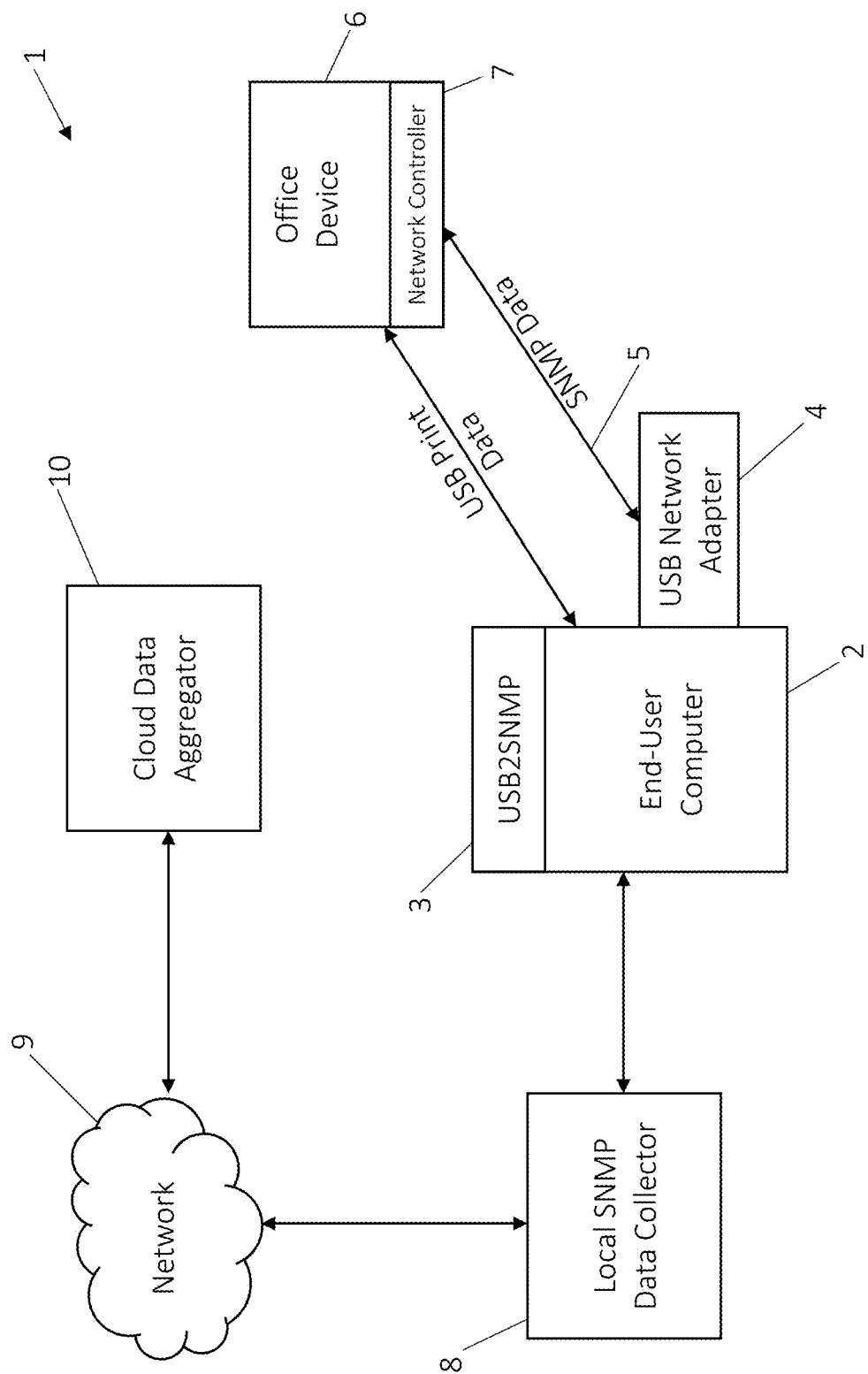
FIG. 2B is a schematic diagram of an embodiment of a system for communicating with locally connected office devices.

FIG. 2B is a schematic diagram of an embodiment of the system 1 for communicating with locally connected office devices. In the embodiment shown in FIG. 2B, the system 1 does not comprise any MIB browser software 11.

Figure 2C:
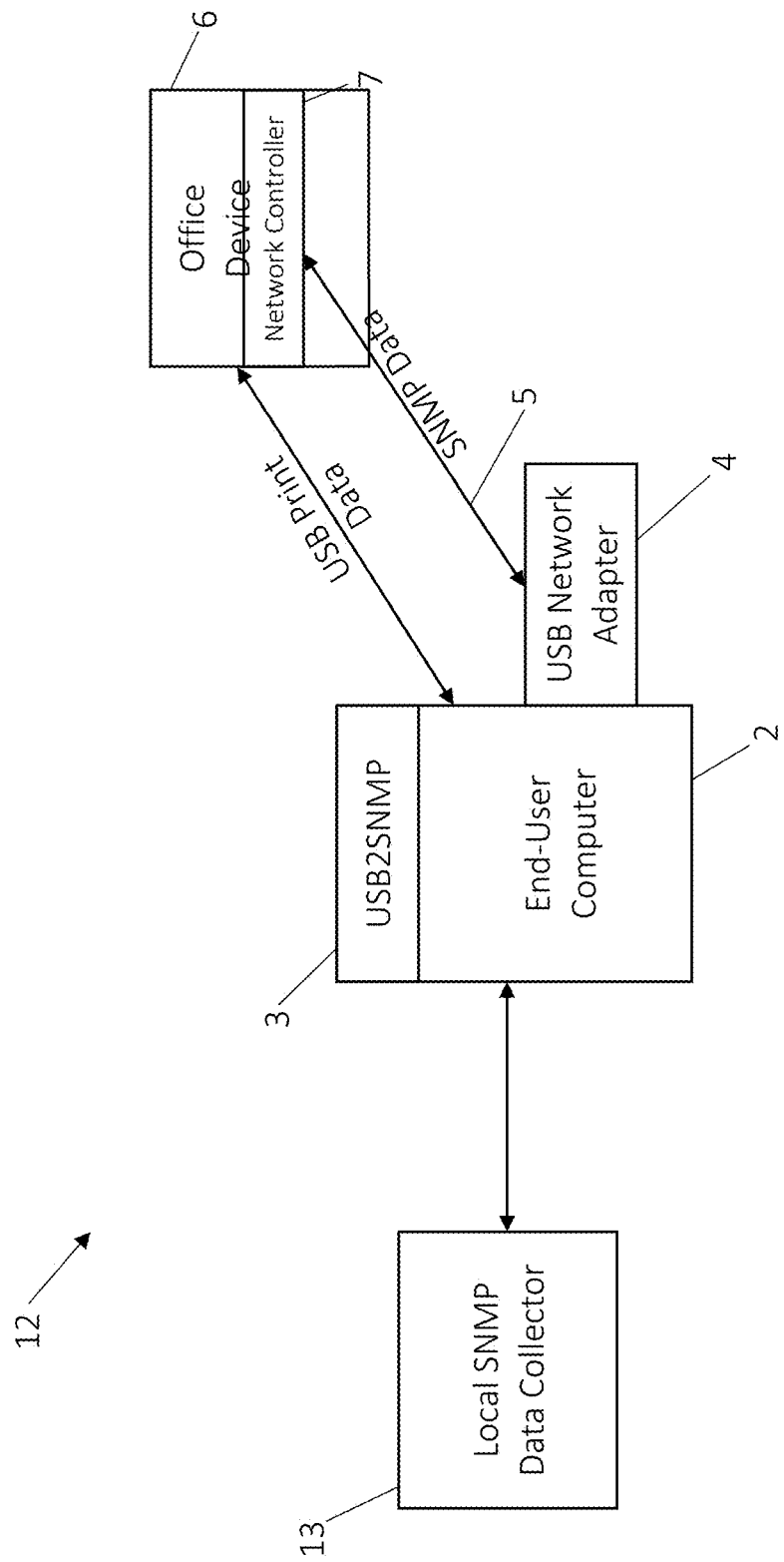
FIG. 2C is a schematic diagram of an embodiment of a system for communicating with locally connected office devices.

FIG. 2C is a schematic diagram of an embodiment of a system 12 for communicating with locally connected office devices. The system 12 shown in FIG. 2C is in some respects similar to the system 1 shown in FIG. 2B. The system 12 comprises: an end-user computer 2; a USB2SNMP component 3; a USB network adapter 4; an Ethernet cable 5; and an office device 6. The office device 6 comprises a network interface controller 7.

The system 12 may comprise a local SNMP data collector and aggregator 13. The end-user computer 2 transmits meter-, supply-, and/or service-data to the local SNMP data collector and aggregator 13. The local SNMP data collector and aggregator 13 may include any suitable data collection software, service, or utility. The local SNMP data collector and aggregator 13 may include any suitable data aggregator software, service, or utility. The local SNMP data collector and aggregator 13 may be configured to receive the data from the office device through the local SNMP data collector and organize the data with other data from other locally connected or wirelessly connected office devices.

The system 1, 12 may be easily setup by connecting the USB network adapter 4 to the end-user computer 2 and coupling the Ethernet cable 5 between the USB network adapter 4 and the office device 6. Any required drivers are installed and firewall configurations are made automatically when the USB network adapter 4 is coupled to the end-user computer 2. The setup further leverages DHCP addressing to automatically configure the network settings for the office device 6 via the USB network adapter 4 and the Ethernet cable 5. Setup of the system 1, 12 is easily completed by running a setup utility on the end-user computer 2 selecting the network adapter, and entering a license key.

Figure 3:
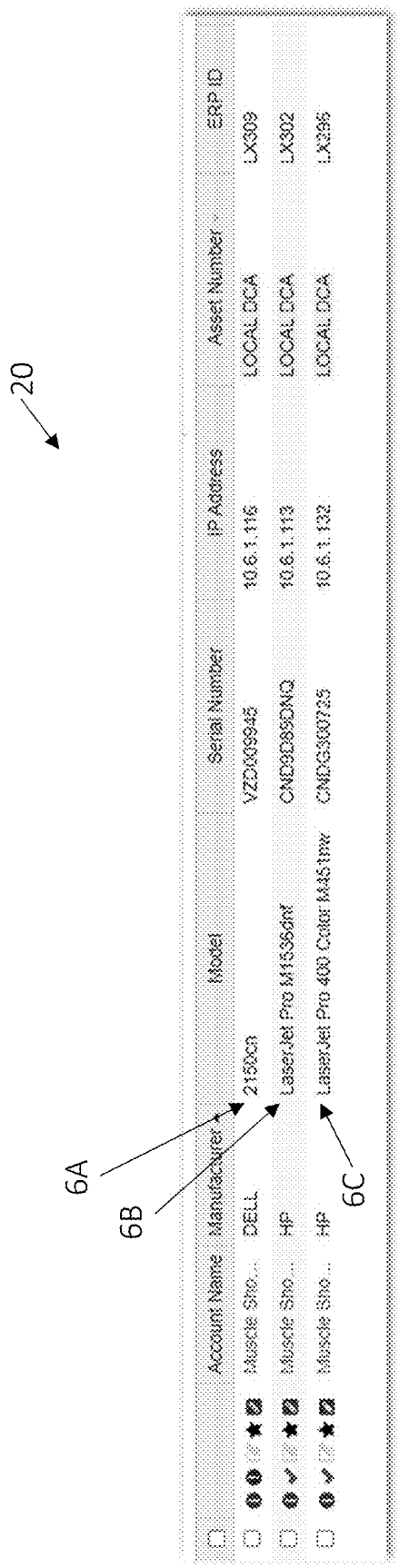
FIG. 3 is a depiction of a textual and visual representation of information about locally connected office devices.

FIG. 3 is a depiction of a textual and visual representation of information about locally connected office devices, for example, showing a data collection software user interface 20 with first, second, and third office devices 6A, 6B, 6C. Specifically, FIG. 3 demonstrates data reporting a variety of locally connected devices inside an FMAUDIT data-collection platform. (Certain information—e.g., Account Name and IP Address—that would be available to a user has been redacted from FIG. 3.)

Figure 4:
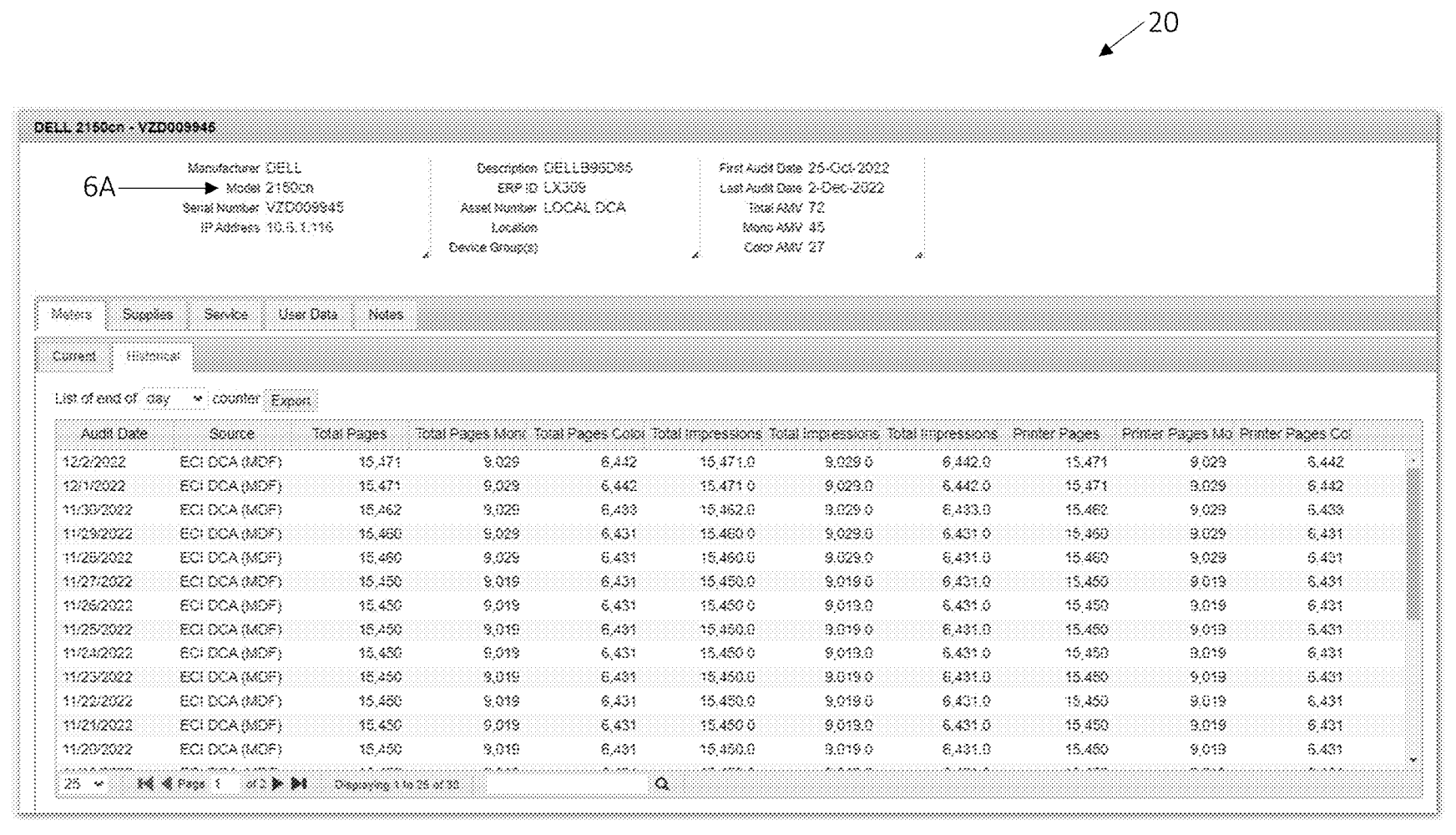

FIG. 4 is a depiction of a textual and visual representation of meter-, supply-, and/or service-data, for example, of the first office device 6A within the data collection software user interface 20. Specifically, FIG. 4 is a depiction of a textual and visual representation of meter data and historical data collection (including evidence that the service has been running continuously). (Certain information—e.g., IP Address—that would be available to a user has been redacted from FIG. 4.)

Figure 5:
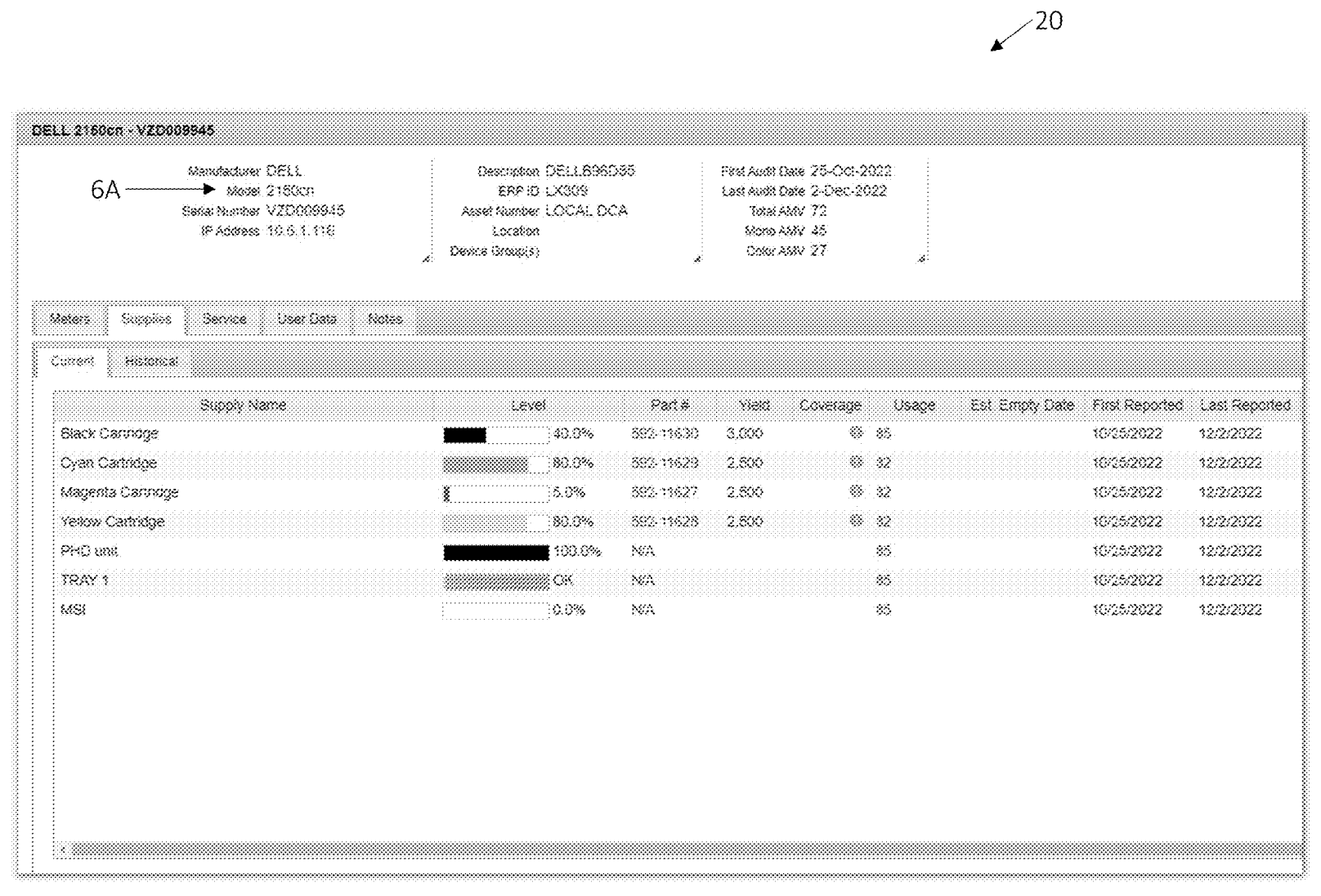

FIG. 5 is a depiction of a textual and visual representation of meter-, supply-, and/or service-data, for example, of the first office device 6A within the data collection software user interface 20. Specifically, FIG. 5 is a depiction of a textual and visual representation of supply data. (Certain information—e.g., IP Address that would be available to a user has been redacted from FIG. 5.)

Figure 6:
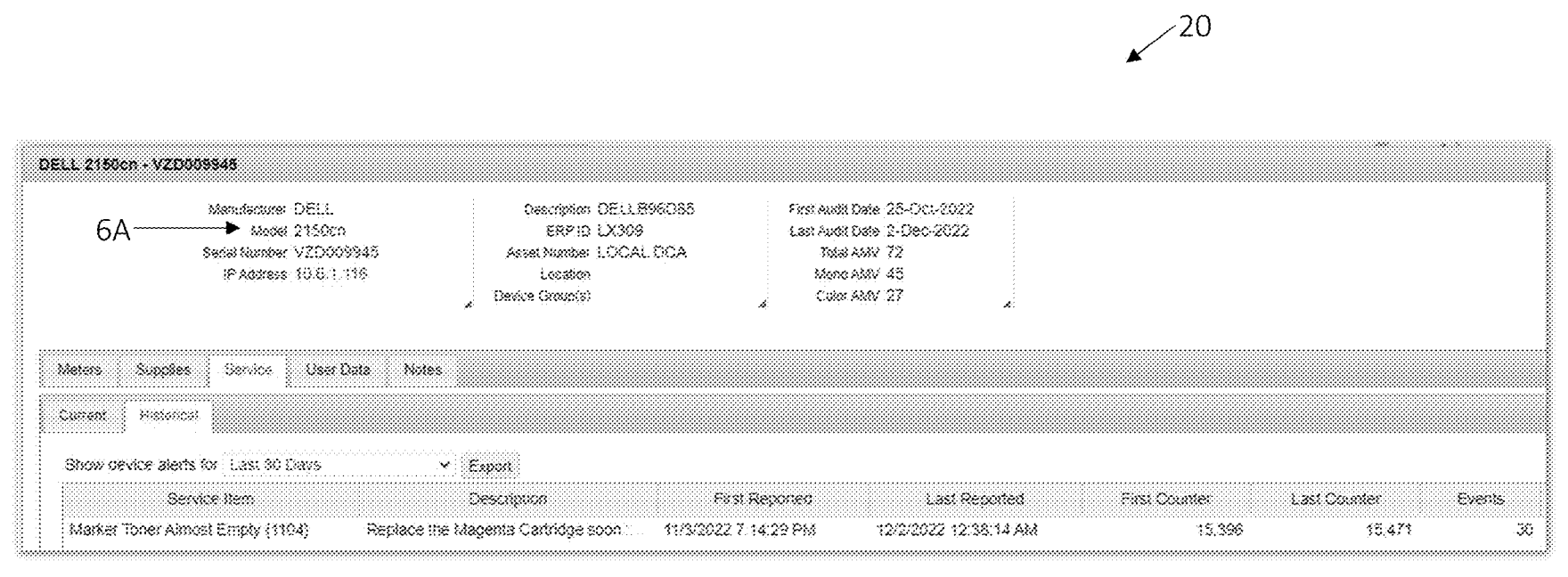

FIG. 6 is a depiction of a textual and visual representation of meter-, supply-, and/or service-data, for example, of the first office device 6A within the data collection software user interface 20. Specifically, FIG. 6 is a depiction of a textual and visual representation of service data. (Certain information—e.g., IP Address that would be available to a user has been redacted from FIG. 6.)

Figure 7:
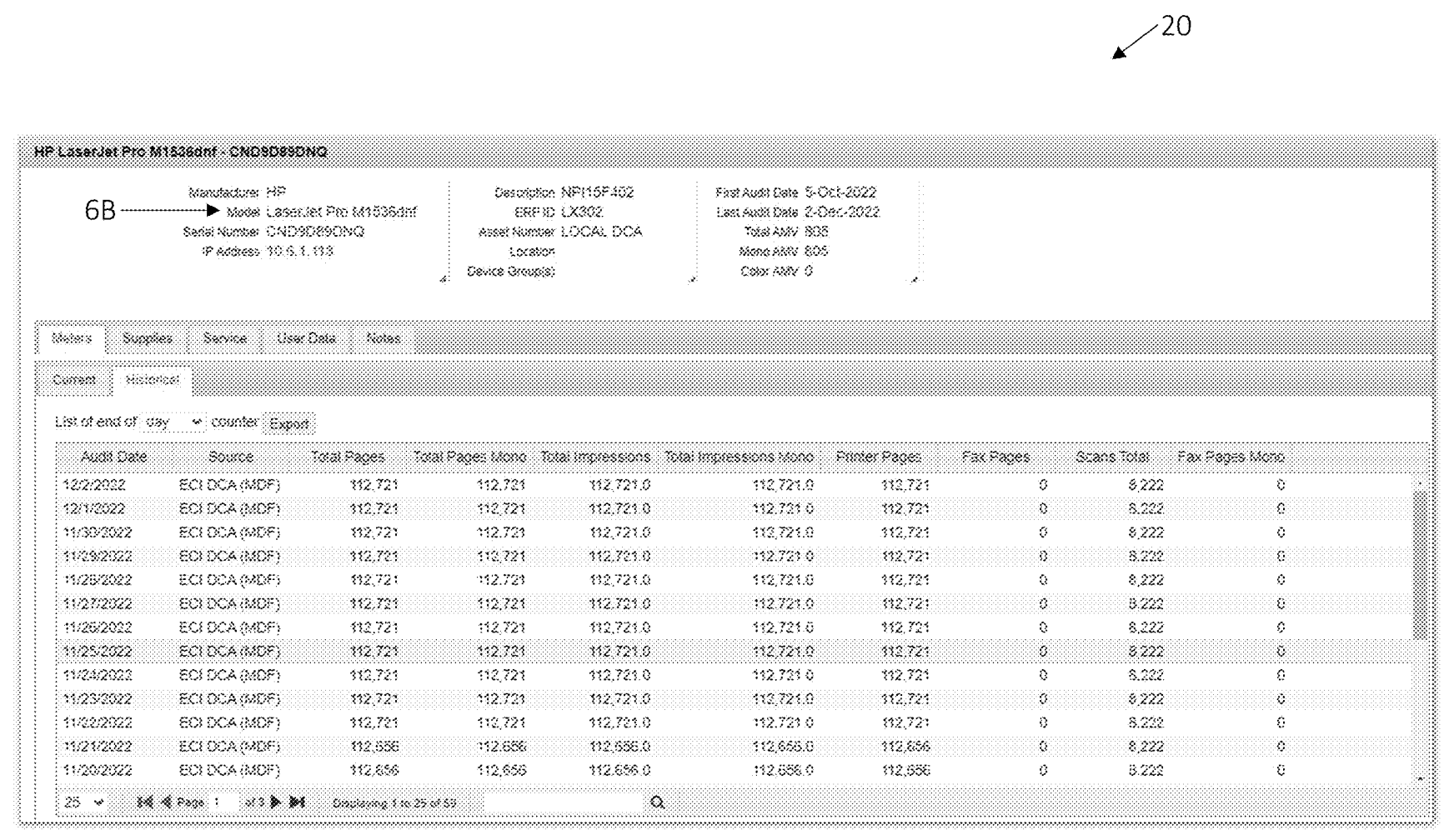

FIG. 7 is a depiction of a textual and visual representation of meter-, supply-, and/or service-data, for example, of the second office device 6B within the data collection software user interface 20. Specifically, FIG. 7 is a depiction of a textual and visual representation of meter data and historical data collection (including evidence that the service has been running continuously). (Certain information—e.g., IP Address—that would be available to a user has been redacted from FIG. 7.)

Figure 8:
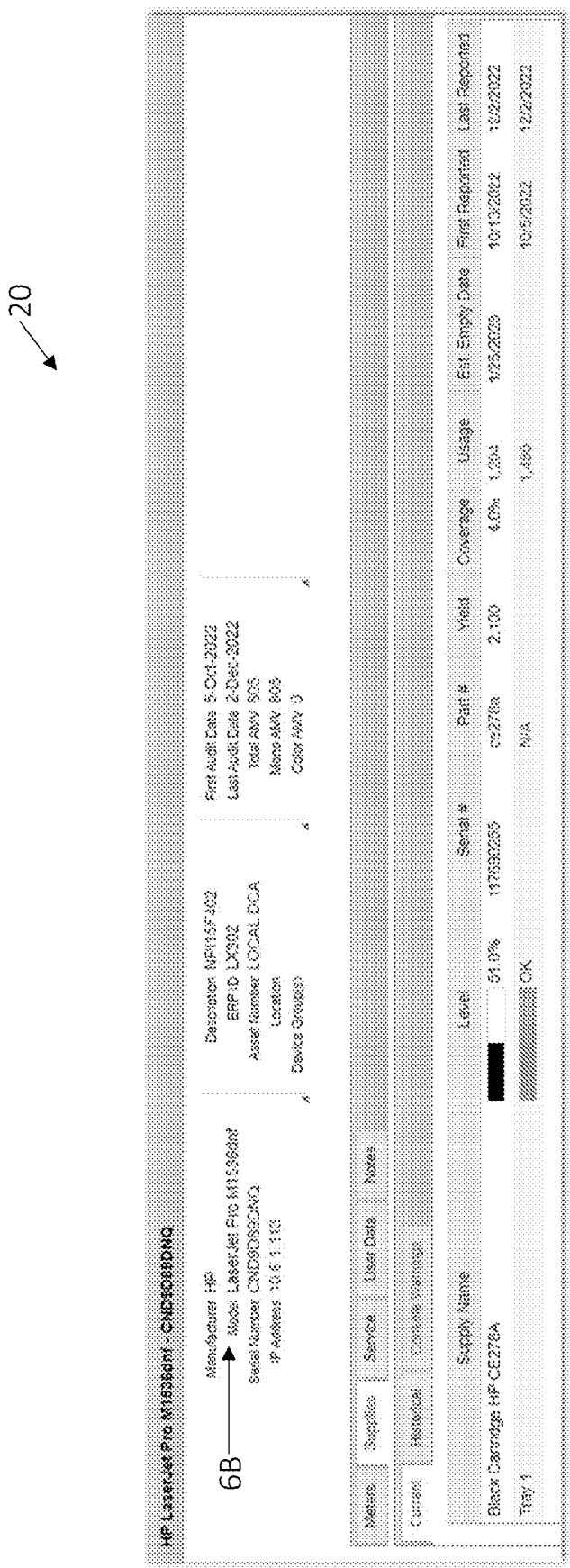
FIG. 8 is a depiction of a textual and visual representation of meter-, supply-, and/or service-data.

FIG. 8 is a depiction of a textual and visual representation of meter-, supply-, and/or service-data, for example, of the second office device 6B within the data collection software user interface 20. Specifically, FIG. 8 is a depiction of a textual and visual representation of supply data. (Certain information—e.g., IP Address—that would be available to a user has been redacted from FIG. 8.)

Figure 9:
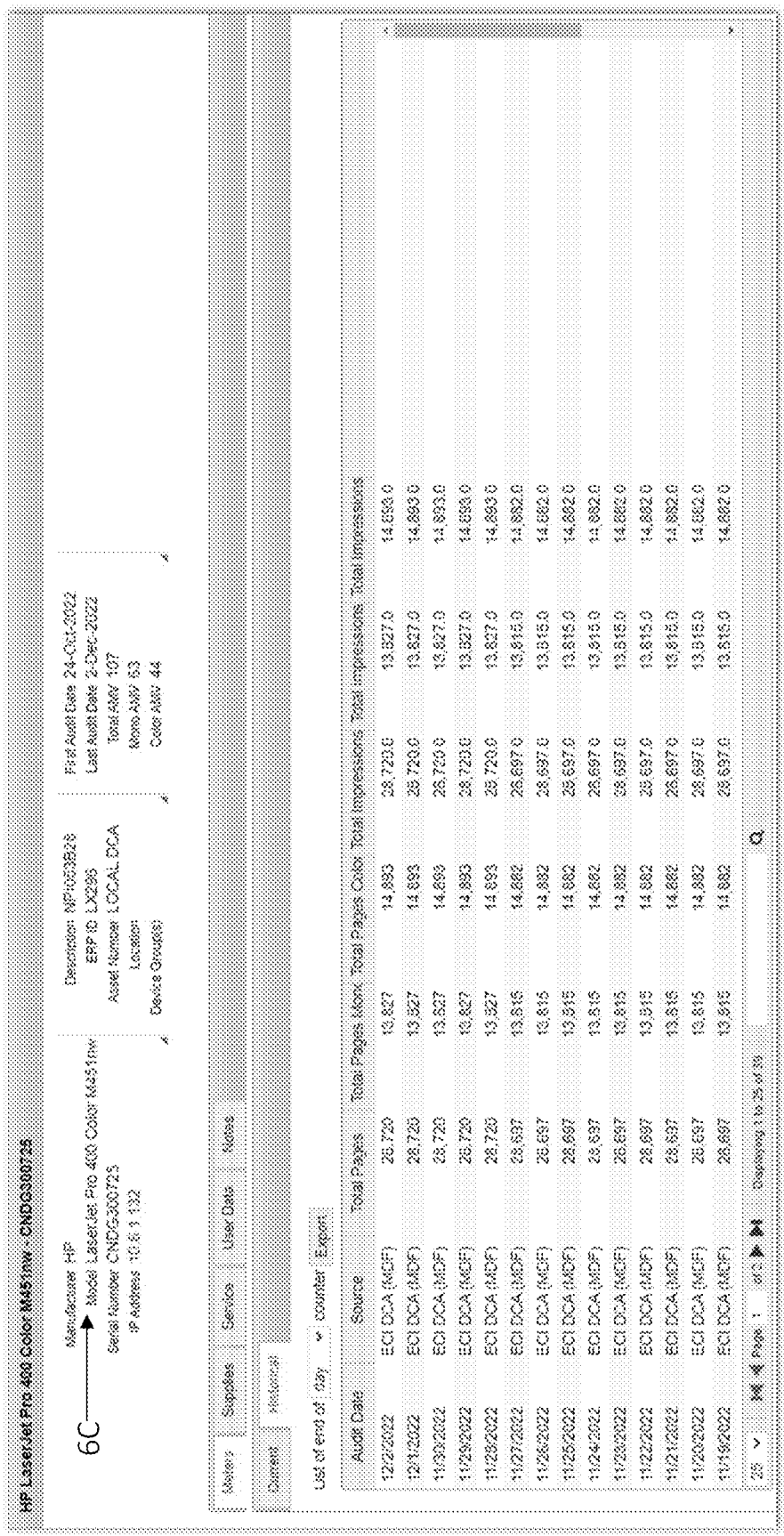
FIG. 9 is a depiction of a textual and visual representation of meter-, supply-, and/or service-data.

FIG. 9 is a depiction of a textual and visual representation of meter-, supply-, and/or service-data, for example, of the second office device 6C within the data collection software user interface 20. Specifically, FIG. 9 is a depiction of a textual and visual representation of meter data and historical data collection (including evidence that the service has been running continuously). (Certain information—e.g., IP Address—that would be available to a user has been redacted from FIG. 9.)

Figure 10:
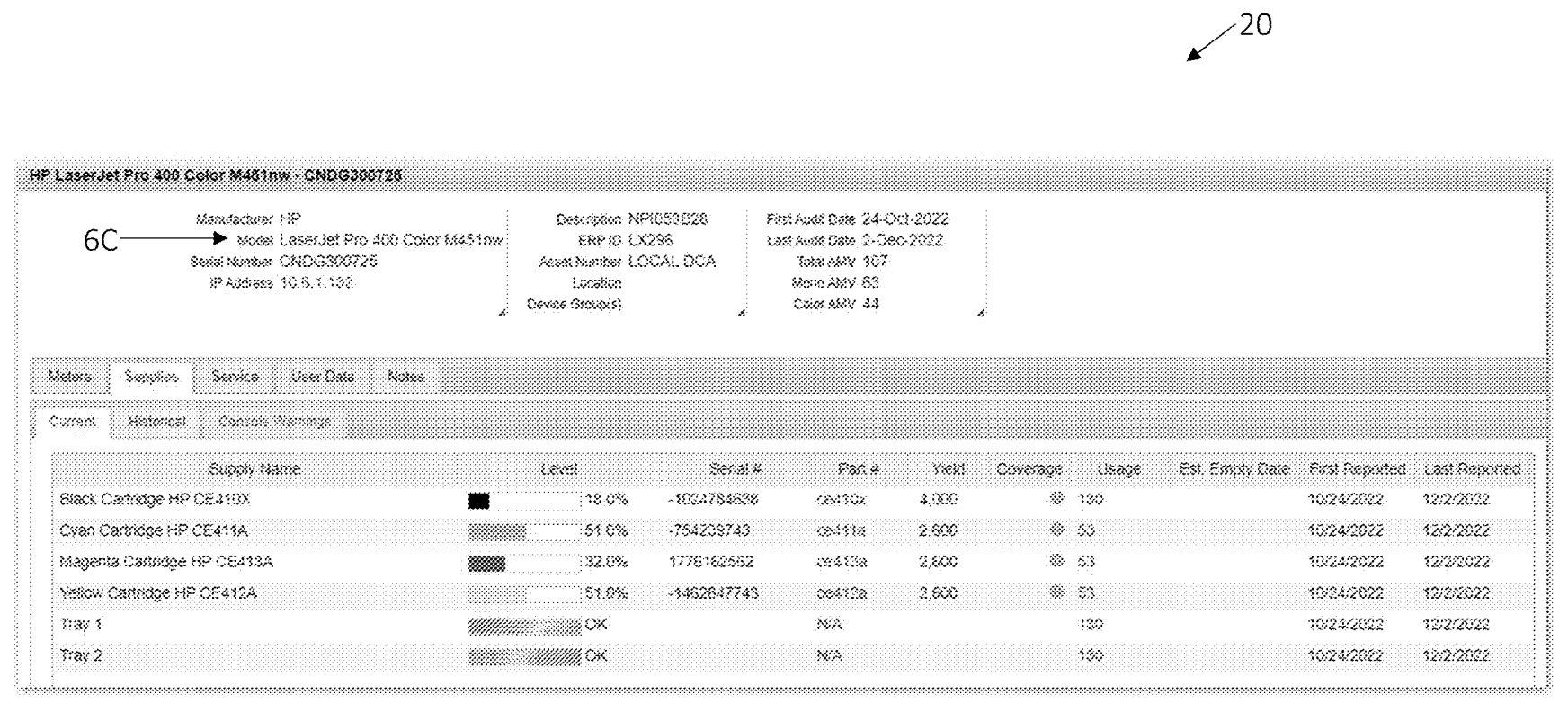

FIG. 10 is a depiction of a textual and visual representation of meter-, supply-, and/or service-data, for example, of the second office device 6C within the data collection software user interface 20. Specifically, FIG. 10 is a depiction of a textual and visual representation of supply data. (Certain information—e.g., IP Address—that would be available to a user has been redacted from FIG. 10.)

Figure 11:
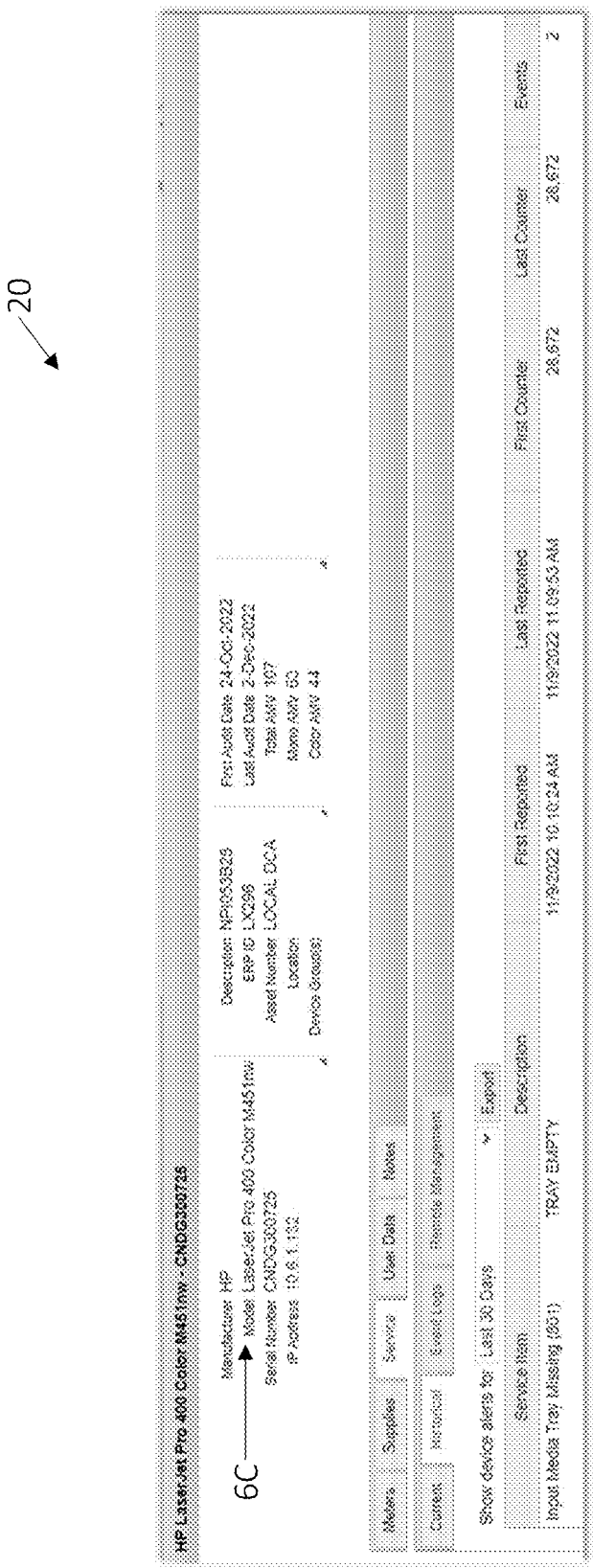
FIG. 11 is a depiction of a textual and visual representation of meter-, supply-, and/or service-data.

FIG. 11 is a depiction of a textual and visual representation of meter-, supply-, and/or service-data, for example, of the second office device 6C within the data collection software user interface 20. Specifically, FIG. 11 is a depiction of a textual and visual representation of service data. (Certain information—e.g., IP Address—that would be available to a user has been redacted from FIG. 11.)

While the foregoing specification has described specific embodiments of this invention and many details have been put forth for the purpose of illustration or example, it will be apparent to one skilled in the art that the invention is susceptible to additional embodiments and that certain of the details described herein can be varied considerably without departing from the basic principles of the invention. It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

What is claimed is:

1. A system for communicating with locally connected office devices, the system comprising:
    an end-user computer;
    a local SNMP data collector communicatively coupled to the end-user computer over a network, wherein a data-collection software is installed on the local SNMP data collector;
    a USB2SNMP software component installed on the end-user computer;
    a USB network adapter coupled to the end-user computer;
    an Ethernet cable coupled to the USB network adapter; and
    an office device coupled to the Ethernet cable, wherein:
        the data collection software installed on the local SNMP data collector is configured to cause the local SNMP data collector to request data from the office device by transmitting SNMP data requests intended for the office device over the network to the end-user computer;
        the USB2SNMP software component installed on the end-user computer is configured to cause the end-user computer to receive the SNMP data requests from the local SNMP data collector over the network and forward the received SNMP data requests from the end-user computer to the office device via the USB network adapter and the Ethernet cable;
        the office device is configured to receive the forwarded SNMP data requests from the end-user computer and respond to the received forwarded SNMP data requests by sending responsive data intended for the local SNMP data collector back to the end-user computer via the Ethernet cable and the USB network adapter;
        the USB2SNMP software component installed on the end-user computer is configured to further cause the end-user computer to receive the responsive data from the office device via the USB network adapter and the Ethernet cable and forward the received responsive data from the end-user computer to the local SNMP data collector over the network; and
        the data collection software installed on the local SNMP data collector is configured to further cause the local SNMP data collector to receive the forwarded responsive data from the end-user computer over the network and treat the received forwarded responsive data as being received from the office device.

2. The system of claim 1, wherein:
the local SNMP data collector includes an aggregator configured to organize the responsive data with other data from other locally connected or wirelessly connected office devices.

3. The system of claim 1, further comprising:
a cloud data aggregator coupled to the network, the cloud data aggregator configured to receive the responsive data from the office device through the local SNMP data collector and organize the data with other data from other locally connected or wirelessly connected office devices.

4. The system of claim 1, wherein:
the responsive data from the office device includes at least one of meter-data, supply-data, or service-data.

5. The system of claim 1, further comprising:
a management information base (MIB) browser software accessed from the end-user computer, wherein the MIB browser software is configured to cause the end-user computer to send test SNMP data requests to the office device.

6. A method for communicating with locally connected office devices, the method comprising:
    receiving, over a network from a local SNMP data collector, an SNMP data request intended for an office device, wherein:
        the local SNMP data collector collective is communicatively coupled to the end-user computer over the network;
        a data collection software is installed on the local SNMP that is configured to cause the local SNMP data collector to request data from the office device by transmitting SNMP data requests intended for the office device over the network to the end-user computer; and
        a USB2SNMP software component is installed on the end-user computer that is configured to cause the end-user computer to receive the SNMP data requests from the local SNMP data collector over the network;
    forwarding the received SNMP data request from the end-user computer to the office device via a USB network adapter and an Ethernet cable, wherein:
        the end-user computer is coupled to the USB network adapter, the USB network adapter is coupled to the Ethernet cable, and the Ethernet cable is coupled to the office device;
        the USB2SNMP software component is further configured to cause the end-user computer to forward the received SNMP data requests from the end-user computer to the office device via the USB network adapter and the Ethernet cable; and the office device is configured to receive the forwarded SNMP data requests from the end-user computer;

receiving, via the USB network adapter and the Ethernet cable from the office device, response data intended for the local SNMP data collector, wherein:

the office device is further configured to respond to the received forwarded SNMP data requests by sending responsive data intended for the local SNMP data collector back to the end-user computer via the Ethernet cable and the USB network adapter; and the USB2SNMP software component is further configured to cause the end-user computer to receive the receive the responsive data from the office device via the USB network adapter and the Ethernet cable; and forwarding the received responsive data from the end-user computer to the local SNMP data collector over the network, wherein:

the USB2SNMP software component is further configured to cause the end-user computer to forward the received responsive data from the end-user computer to the local SNMP data collector over the network; and the data collection software installed on the local SNMP is configured to further cause the local SNMP data collector to receive the forwarded responsive data from the end-user computer over the network and treat the received forwarded responsive data as being received from the office device.

7. The method of claim 6, further comprising:
restricting access to the office device to only the end-user computer via the USB network adapter.

8. The method of claim 6, further comprising:
regularly collecting data from the office device as directed by the data collection software.

9. The method of claim 6, further comprising:
aggregating the responsive data from the office device with other data from other locally connected or wirelessly connected office devices on the local SNMP data collector.

10. The method of claim 6, further comprising:
sending the responsive data from the local SNMP data collector to a cloud data aggregator configured to organize the data with other data from other locally connected or wirelessly connected office devices.

11. The method of claim 6, further comprising:
sending test SNMP data requests from a management information base (MIB) browser software to the office device for testing purposes, wherein the MIB browser software is accessed from the end-user computer and is configured to cause the end-user computer to send the test SNMP data requests to the office device.

12. A system for communicating with locally connected office devices, the system comprising:

an end-user computer;

a local SNMP data collector communicatively coupled to the end-user computer over a network, wherein a data-collection software is installed on the local SNMP data collector;

a USB2SNMP software component installed on the end-user computer;

a USB network adapter coupled to the end-user computer; and a locally connected office device coupled to the USB network adapter, wherein:

the data collection software installed on the local SNMP data collector is configured to cause the local SNMP data collector to request data from the office device by transmitting SNMP data requests intended for the office device over the network to the end-user computer;

the USB2SNMP software component installed on the end-user computer is configured to cause the end-user computer to receive the SNMP data requests from the local SNMP data collector over the network and forward the received SNMP data requests from the end-user computer to the office device via the USB network adapter;

the office device is configured to receive the forwarded SNMP data requests from the end-user computer and respond to the received forwarded SNMP data requests by sending responsive data intended for the local SNMP data collector back to the back to the end-user computer via the USB network adapter; and the USB2SNMP software component installed on the end-user computer is configured to further cause the end-user computer to receive the responsive data from the office device via the USB network adapter and forward the received responsive data from the end-user computer to the local SNMP data collector over the network; and the data collection software installed on the local SNMP data collector is configured to further cause the local SNMP data collector to receive the forwarded responsive data from the end-user computer over the network and treat the received forwarded responsive data as being received from the office device.

* * * * *